United States Patent [19]

Edgar

[11] Patent Number: 4,468,694

[45] Date of Patent: Aug. 28, 1984

[54] APPARATUS AND METHOD FOR REMOTE DISPLAYING AND SENSING OF INFORMATION USING SHADOW PARALLAX

[75] Inventor: Albert D. Edgar, Austin, Tex.

[73] Assignee: International Business Machines Corporation, Armonk, N.Y.

[21] Appl. No.: 434,690

[22] Filed: Oct. 15, 1982

Related U.S. Application Data

[63] Continuation-in-part of Ser. No. 221,222, Dec. 30, 1980, abandoned.

[51] Int. Cl.$^3$ .............................................. H04N 7/18
[52] U.S. Cl. ..................................... 358/93; 353/28; 358/231; 382/48
[58] Field of Search ................. 358/93, 106, 107, 231, 358/101; 353/11, 28; 340/729; 364/521, 522; 382/48

[56] References Cited

U.S. PATENT DOCUMENTS

| | | | |
|---|---|---|---|
| 2,058,681 | 10/1936 | Gould | 358/231 |
| 3,631,396 | 12/1971 | Spertus | 353/28 |
| 3,832,485 | 8/1974 | Pieters | 358/183 |
| 3,932,733 | 1/1976 | Olsen et al. | 235/151 |
| 3,943,344 | 3/1976 | Kidode et al. | 235/151.32 |
| 4,012,634 | 3/1977 | Bouton et al. | 250/201 |
| 4,076,398 | 2/1978 | Galbraith | 353/28 |
| 4,124,285 | 11/1978 | Johnson | 353/28 |
| 4,146,924 | 3/1979 | Birk | 382/48 |
| 4,217,649 | 8/1980 | Doundoulakis | 364/516 |

*Primary Examiner*—Howard W. Britton
*Attorney, Agent, or Firm*—John W. Henderson, Jr.; Douglas H. Lefeve

[57] ABSTRACT

A scanning beam display system is used as a projection display and as a reflective flying-spot scanner using a plurality of photoreceptors to sense depth. Used as a display, the projection of a document-size image from overhead onto a work surface such as a printed form provides a naturally oriented, non-invasive display. Beam modulation and contextual subtraction permit the flying-spot function in ambient light. Used as a combination display and scanner, inherent registration of the display and data input functions permit interaction with an operator by displaying on and sensing form any document or work object. A plurality of non-overlapping sensors operate with the flying-spot function to receive images alike in perspective but differing in shadow placement, from which relative distances and object boundaries are easily derived. Used without the display function, a visualization of a work area is obtained that is much more interpretable by a computer than with standard visual parallax for improved robotic visual perception. Acting in concert, the methods of this invention form a touch sensitive image on a work surface devoid of display or sensing hardware.

11 Claims, 17 Drawing Figures

APPARATUS AND METHOD FOR REMOTE DISPLAYING AND SENSING OF INFORMATION USING SHADOW PARALLAX

DESCRIPTION

This is a continuation-in-part of application Ser. No. 221,222, filed 30 December 1980, now abandoned.

1. Technical Field

This invention relates to interactive display systems and more specifically to terminal systems for non-invasive display and sensing of data.

2. Background Art

The device of this invention performs the functions heretofore requiring several separate devices and technologies. These are reviewed as they relate to display, data input, and remote contact sensing.

Referring first to display, it has been a goal in the display of information in an office environment to minimize the desk space required by a personal display. Prior art alternatives include flat display technologies, such as plasma discharge and liquid crystal, and integration of a display into the work table or desk. It is believed such a "non-invasive" display would facilitate acceptance of a terminal in areas such as principal support.

Referring next to data input, besides the keyboard for the input of coded information, there are diverse means of inputting data to a computer system. These will be examined by questioning: does the technology permit an output image to occur in the same plane as the input data? Can an operator input data by tracing over a printed or photographic image such as a map? Can the operator input data in real time by writing on paper? Can an ordinary writing instrument or even a finger be used to point, or is a special device needed? Can the input device be used on a horizontal desk top? Can images from photographs, books, or other prepared sources be entered? Now the various input technologies are discussed. A photocell, usually mounted on the end of a rod, and used with a CRT or similar refresh device, is called a light pen. In use, the photocell is pointed to a section of the image selected by a user. The photocell will then respond to the point of light produced as the scanned electron beam of the CRT passes under the photocell. The time of this response in relation to the known position of the electron beam indicates the location of the light pen relative to the image. This technology allows in-plane interaction with the image, and of course, possesses inherent image registration. It does not permit graphic tracing, finger manipulation, real time entry on paper, use on a horizontal desk top surface, or the inputting of charts, books, or photographs. A second technology to be discussed is the data pad. A data pad system usually consists of a flat, relatively thin "pad" of specific construction, and a pen, often of specific construction. Many technologies are used, and will not be discussed here as they are not relevant to this invention, however, their features are relevant and will be examined. Several types of data tablets are made of transparent material, and by placing them over a display such as a CRT, a nearly in-plane interaction is possible. However, there is no inherent image registration and parallax problems prevent accurate pointing. Most data tablets are opaque, and are used quite differently than transparent tablets. Opaque tablets permit graphic tracing, real time entry on paper, and the use of a horizontal desk top surface. A few provide finger manipulation at the expense of precision when using a pick such as a pencil or pen. Many require a special pen to be used. They, of course, do not permit in-plane interaction with a computer image, and cannot input from charts, books, and photographs. The final input technology to be considered is the facsimile scanner, which converts a document into an electronic image. The scanner is the only technology capable of inputting charts, books and photographs, but possesses generally none of the other features being examined. The technology by which this is accomplished may be that of a television pickup tube such as a vidicon, a charge-coupled device with an array of sensors and a shift register, a mechanically rotating drum, or a flying spot scanner. The flying spot scanner is of interest and will be examined further. This device gets its name from a "flying-spot" of projected light that rapidly moves across an image to be scanned. A photocell aimed generally at the image will receive more light as the spot passes over a white surface, and less light as the spot passes a black area, thus effectively scanning selected areas of the scene. The first television images were "seen" by a flying-spot scanner using a mechanically rotating disk called a Nipkow disk. Modern flying-spot scanners use a CRT to generate a moving spot. They are popular for television pickup from film and are still used in facsimile scanners by focusing the flying-spot from a high-resolution CRT onto a document in a light-tight box.

Referring finally to remote contact sensing, it may be seen that contact sensing presents a distinct problem from positional sensing within a plane. With a light pen, for example, data-input normally is not desired until the image is touched. When using a data pad for real-time handwritten entry, it is of course vital that when the pen is lifted marginally above the paper that the computer be aware that the line is discontinued. This sensing is generally done either by a mechanical switch or electrical device in the pen, or with a special electrical device in a data pad on which the input is to be written. As another means of contact sensing, when writing or generating artwork, a human will sense contact by tactile feedback and, in slow precision work, by visual parallax. Using parallax, the image including the pen is viewed simultaneously from two angles. Only when two objects are in the same plane will their apparent separations appear equal from both angles. Parallax is also used to judge distance, angle, and separate distinct objects. Parallax is very difficult to perform with a computer system because not only is high resolution required, but the techniques of pattern recognition necessary to find and separate objects are not yet generally of adequate quality, despite much work in this field which is considered a subject of artificial intelligence. The problem is that surface details must be used to derive correlations, and these details themselves camouflage dimensional boundaries.

If it were possible to combine all the desired features of the display, data input, and contact sensor discussed above, the resulting device would form a touch sensitive image devoid of imaging or sensing hardware in the display area, permitting an ordinary paper on an ordinary desk to become a display and also to sense contact with an ordinary pencil or even a finger. In the prior art, such a device was not possible.

DISCLOSURE OF INVENTION

It is an object of this invention to provide a completely non-invasive means of display onto a work area.

It is a further object of this invention to provide a single display and input device featuring in-plane interaction, inherent image registration, graphic tracing, finger manipulation, real time entry on paper, horizontal desk top surface compatibility, and ability to input facsimile from charts, books, and photographs.

Another object of this invention is to provide a means of remotely sensing contact of a pen, pencil, finger, or other pick with a surface.

A corollary object to the above is to provide means of forming a touch sensitive image devoid of imaging or sensing hardware in the display area.

A final objective is to provide an imaging system capable of viewing surfaces and surface angles independent of surface markings.

The above objects are accomplished in accordance with the teachings of this application by providing a display system for projecting an image onto a work surface such as a desk top. A sensor is positioned to view the projected image as in a flying-spot scanner, however the beam is modulated and contextual illumination subtracted so to permit operation in normal ambient light. Another sensor is positioned so as to view the projected image from a different angle than the first sensor, permitting the use of "shadow parallax" in which the difference of shadows, rather than viewing angle, is used to detect dimension and contact sensing, and to separate surface markings from texture and dimensional features.

BEST MODE FOR CARRYING OUT THE INVENTION

Figure 1:
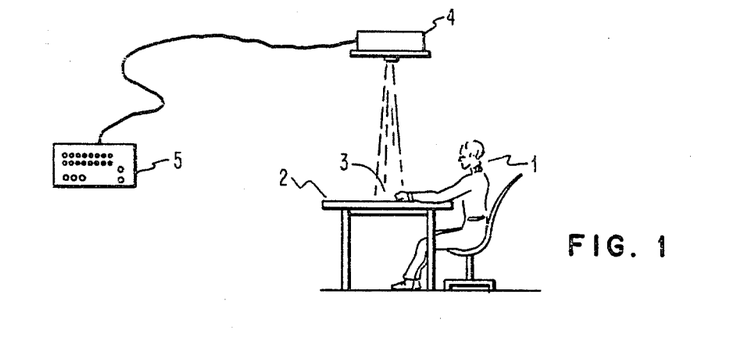
FIG. 1 depicts an environment in which the system operates.

Referring now to FIG. 1, by way of illustration a typical operating environment is presented. An operator 1 is seated at work area 2, and views a projected image 3, which may be focused on a document, work piece, or any other material. The image is projected from device 4, which contains both a display system and sensors to be discussed in detail later. Device 4 is connected to computer system 5 including a central processor and storage which controls what is displayed by device 4 and interprets the information received by the sensors in device 4 to form a complete system. This application will be concerned with the operation of device 4, its effect on image 3 and its capacity to input data from work area 2, and with the method used in computer 5 to initially interpret the data received by the sensors in device 4.

Figure 2:
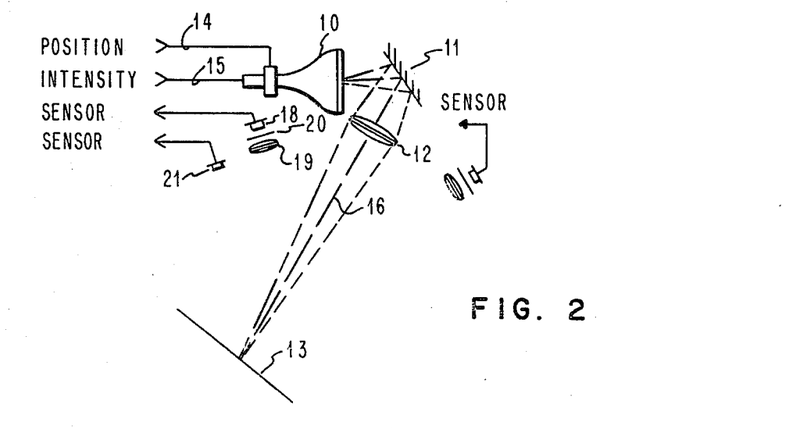
FIG. 2 diagrams the operation of the invention.

The device 4 of FIG. 1 is detailed in FIG. 2. The image produced by a projection kinescope, or high intensity CRT 10, is reflected by mirror 11 and focused by lens 12 onto work surface 13. The work surface 13 is equivalent to the work area 2 in FIG. 1. The image formed by CRT 10 is controlled by position and intensity signals 14 and 15, respectively, input from conventional computer and drive circuitry (not shown). The high intensity CRT could, of course, be replaced by a laser and acoustic scanner, or other equivalent technology. The direction of projection along line 16 is not required to be perpendicular to the work surface 13, and, in general, an angle other than perpendicular may be chosen to minimize the shadowing of the image by the operator. Unlike a lamp, specular reflection off the work piece of the projected image improves image brightness and contrast. Geometric distortions of angled projection are correctable in the deflection control circuitry, and focus is corrected by a lens-image tilt as is common practice in view camera photography. The image formed on work area 13 is completely non-invasive in that there is no display hardware in the area of the image. The image may be formed on many materials, for example, if projected onto a paper form, a forms fill-in function can be easily performed, with the projected image and printed image both easily seen and distinguished from one another.

Continuing now with FIG. 2, photocell 18 is positioned to view the image projected on work area 13, acting as a flying-spot scanner type sensing element. The photosensor 18 is one of several identical assemblies that view the image from different angles. The use and positioning of the others will be discussed later. However, unlike a flying-spot scanner, the sensing from the projected image must operate in an environment of normal work area illumination, which typically in an office includes fluorescent lights that flicker at the 120 Hz power cycles of the 60 Hz power line.

Methods of suppressing the effects of ambient light will now be presented. The angle of view by photocell 18 is limited by lens assembly 19 to include only the projected image on plane 13. However even after this angle limiting the magnitude of the ambient light reaching sensor 18 is typically several times greater than the magnitude of light originating from the projected image. A colored filter 20 matched to the projected color and counter-matched to the ambient light color further reduces the effect of ambient light. If a narrow-band phosphor is used in CRT 10 and those bands are separate from the mercury bands in fluorescent lighting, a narrow band interference filter or spectral separator can be used for a greater effect. A context sensor 21 can be added to purposefully receive primarily ambient light. This signal of ambient light is then subtracted from the signal from sensor 18, leaving in purer form a signal representing the magnitude of light originating from the projected image alone. Also the intensity control 15 to the CRT may be modulated which, in conjunction with a fast-decay phosphor in CRT 10, causes photocell 18 to receive an amplitude modulated signal, with amplitude corresponding to the reflectance of the point being scanned on work area 13. Because the harmonics from a fluorescent tube typically fall off at about 6 db/octave above 120 Hz, modulation raises the desired signal above the noisy base-band to a frequency with little interference. The modulation may be performed in hardware, or in software by alternately toggling the beam on and off and reading the light in each state. To summarize, the effect of ambient light is removed by a combination of spatial filtering, spectral filtering, context nulling, and modulation-demodulation.

In conjunction with the ambient filtering, the unit is able to perform as a flying-spot scanner, inputting images from documents, forms, photographs, and other facsimile sources laying on an ordinary work surface. It is also able to display information concurrent with inputting information from the same plane on which the display appears, with both input and output functions featuring inherently perfect spatial registration because the same "flying-spot" performs both functions. An example of an application using this feature is interactive forms fill-in, allowing a computer to "highlight" lines to be filled in while projecting related data or suggested responses. Another example is an interactive assembly station, allowing a computer to find and "highlight" parts, show by direct pointing exactly where a part is to go, and check for visually correct assembly.

To permit general data entry, the system must be capable of remotely sensing contact between a pointer or pick, such as a pencil or finger, and the work surface being viewed. This will be accomplished with a technique which is given the name "shadow parallax" as is now described.

Figure 3:
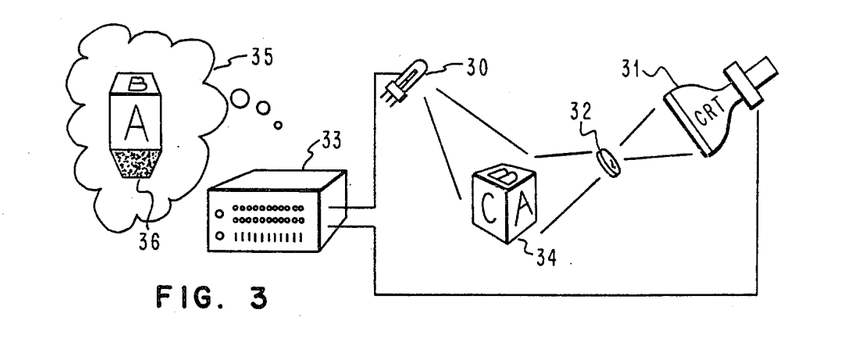
FIG. 3 depicts shadowing perspectives with flying-spot scanning.

Referring now to FIG. 3, consider the flying-spot scanner consisting of photosensor 30 and projection CRT 31 with lens 32. A computer 33 viewing the scene 34 via the photosensor 30 would see objects in the perspective 35 of the projection scanner light source, CRT 31 and lens 32. The photosensor 30 through which the computer viewed the scene 34 would appear in the image 35 as a light source, capable of casting shadows 36, but not affecting perspective. Note the reciprocal effect of the source-sensor arrangement on shadows and perspective compared to conventional imagery.

Figure 4:
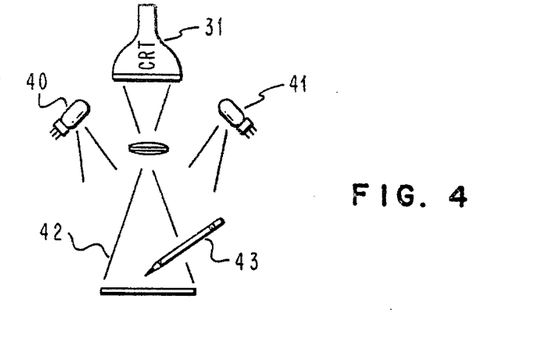
FIG. 4 shows a two-sensor arrangement for shadow parallax.
Figure 5:
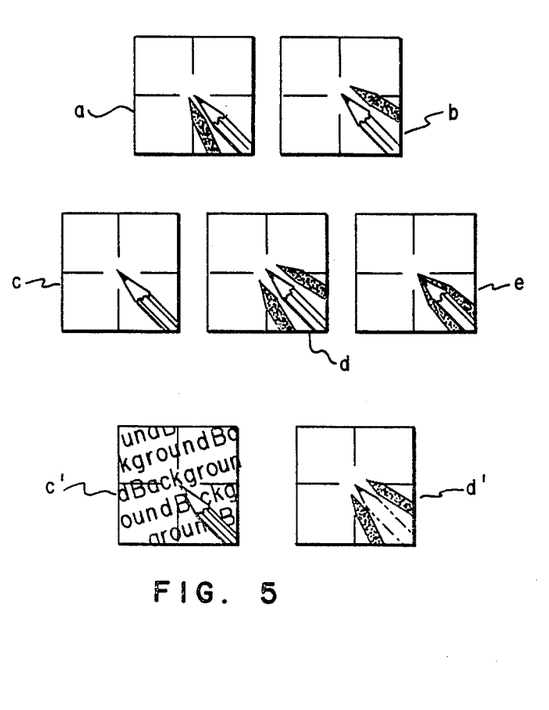
FIG. 5 illustrates the use of shadow parallax in remote contact sensing.

Next consider the two sensor arrangement of FIG. 4. Depending on which sensor 40 or 41 is selected through which to image scene 42, a deep shadow will appear either on the left or right of the pencil 43, cast by the virtual source, which is the selected one of the two sensors 40 or 41. These images are shown in FIG. 5 as a and b. Note that both shadow images can be viewed independently and simultaneously, without interference between them. Unlike binocular vision, which permits several perspectives but with the same shadows, the nature of a flying-spot scanner does not permit independent perspectives, but does permit a plurality of independent shadows. The latter effect, called here "shadow parallax", as opposed to perspective parallax, has strong advantages in the present invention. Shadow parallax is the complement of stereoscopic vision.

The image formed by taking the mathematical maximum of the signal point by point from the left and right sensors of FIG. 4 is shown in c of FIG. 5 to be free of all shadows. It may be used to capture the location of the pencil using conventional methods of pattern recognition. The image formed by taking the point by point minimum of the left and right sensors is shown in d of FIG. 5 to have very deep shadows on both sides of the pencil. As contact is made with the surface, the two shadows merge, as in e of FIG. 5. After the pencil location is determined from c, the ability to distinguish between states contrasted in d and e is simple. A triangle of three sensors, or more, would aid in sensing contact at arbitrary pick angles.

Common perspective parallax refers to distances relative to the sensor, and is unable to measure the distance to surfaces, such as white paper on which surface details are extremely faint, or graph paper for which the correlation solution would be multi-valued. Shadow parallax, on the other hand, directly measures the third dimension relative to the writing surface, and thus performs equally as well with thin paper, paper pads, or an irregular surface such as a calculator keyboard or bound notebook, or with clean white paper, graph paper, or documents. In addition to better function, shadow parallax also realizes a cost advantage, as only the sensor, not the scanner, is duplicated, and less computing power is needed as the difficult image correlation of different visual perspectives is obviated.

Referring again to FIG. 5, illustration c represents the shadowless image which the computer could use to track the x-y position of the pencil. In practice, a distracting background would complicate tracking, as illustrated in c'. Dividing the image of d by c, with appropriate provision for the case of c approaching zero, cancels the pencil, text, and other distractions, leaving only the very black shadows of d' for easy computer tracking, free from camouflaging patterns.

Figure 6:
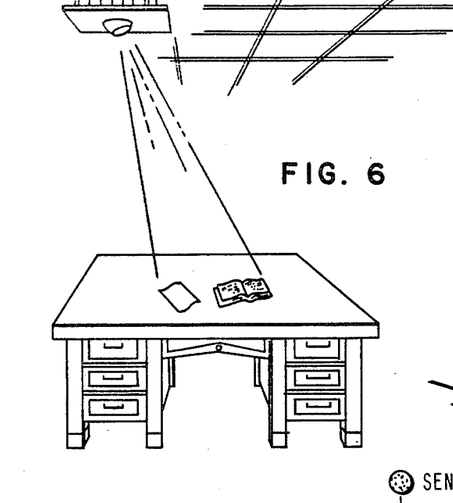
FIGS. 6-7 portray alternate forms of the invention.
Figure 7:
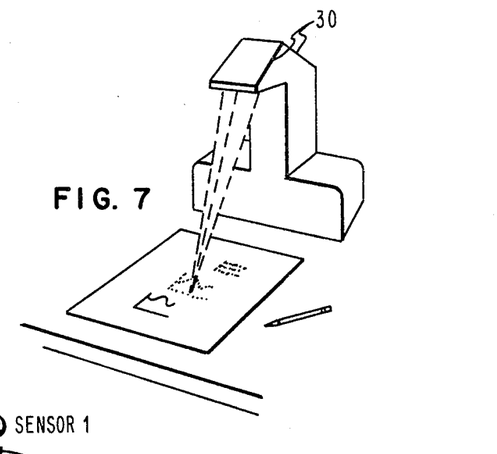

Referring now to FIG. 6 and FIG. 7, alternate physical forms of the invention are portrayed. FIG. 6 shows a system with the entire module ceiling mounted in a recessed box resembling a standard 2×4 feet fluorescent light fixture module. A similar alternative could form the assembly to resemble a track light fixture which could be mounted from a suspended rail. In both cases, the system could draw power through the ceiling wiring as would a lamp, and could be connected to a computer also via hidden ceiling wiring or infrared data link. Mounting the system in the ceiling would provide the most non-obtrusive arrangement. A second alternative is shown in FIG. 7, in which an upward pointing CRT is contained in the vertical "neck" and a lens with two mirrors 30 is held in the head to redirect the image down at a desirable angle. This system, resembling a "desk lamp", would be portable and require no special installation. Other configurations are, of course, possible, and these are given as samples and not limits.

Figure 8:
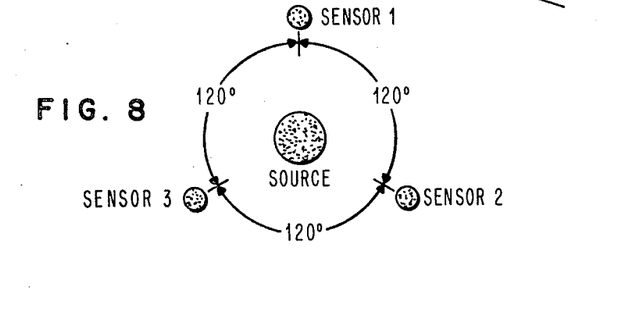
FIGS. 8-9 illustrate the use of shadow parallax in dimensional form sensing.
Figure 9:
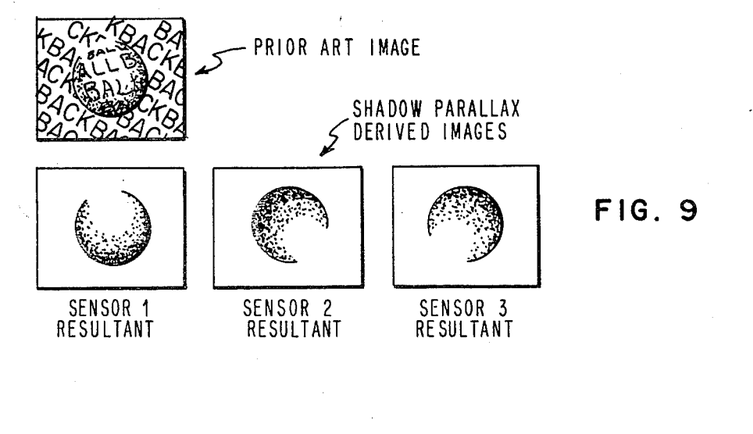

So far the description has used shadow parallax to remotely sense Z motion of a pick relative to a plane, and contact of the pick with the plane. Shadow parallax can be used to obtain an image containing only shadows and surface texture, devoid of surface albedo patterns, as though everything were painted gray, reminiscent of an electron micrograph. This idealized "all gray" image would aid the ability of computer-driven industrial robots to locate and manipulate parts. Computer processing of input information to detect the edge of an object is known in the prior art. For example, the book entitled *Pattern Recognition Techniques*, by J. R. Ullmann, copyright 1973 by Butterworth and Co., discusses such techniques on pages 44-45. By using three sensors arranged as in FIG. 8, and dividing the image from each by the maximum of all three, (analogous to dividing the images of FIG. 5 a by c and b by c) to obtain the effect illustrated in FIG. 9, a three-dimensional mapping and true physical boundary sensing of the environment is easily obtained. Such a mapping has been an elusive quest for artificial intelligence and industrial robotics through decades of research attempting to use stereo parallax or pattern extraction of a single image. Shadow parallax is a key to using computer-driven robots for wide-ranging applications from parts assembly to precision dentistry.

Table 1 shows, by way of example, a sample computer program for the IBM Personal Computer which accepts inputs of the type generated by the sensor arrangement shown in FIG. 4 to generate images of the pencil and its shadows. The program is written in the BASIC language and is easily understood by those with knowledge of this common language with reference to the following discussion. The subroutine beginning at line 1000 simulates the scanning function by returning a "scan line" of numbers from a computed image. Inputs to this routine include the location of the sensing element or shadow direction, and the height of the pencil above the paper. The subroutine beginning on line 2000 outputs a scan line on the IBM Personal Computer printer using a technique called "error propagation" to achieve grey-scale, details of which are not relevant to this patent.

Figure 10:
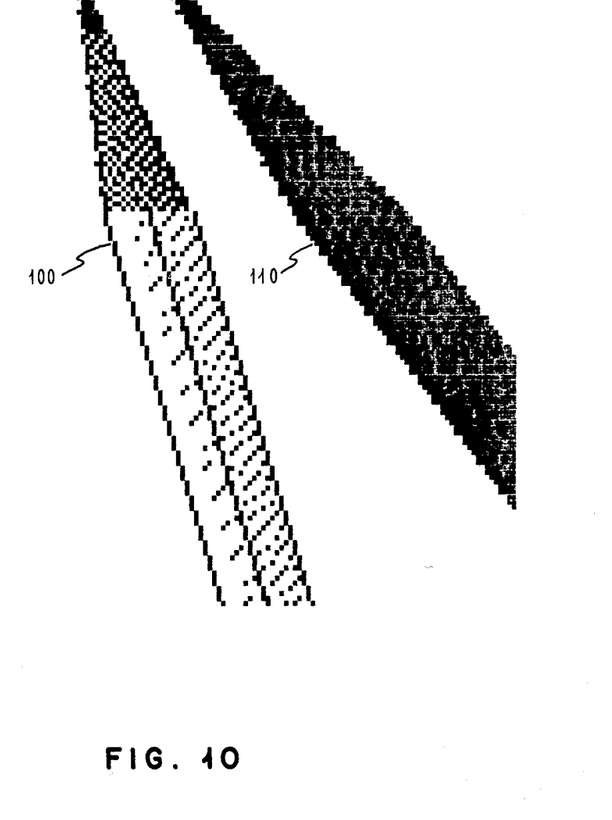
FIGS. 10-17 illustrate a computer implementation of the shadow parallax remote contact sensing of FIG. 5.
Figure 11:
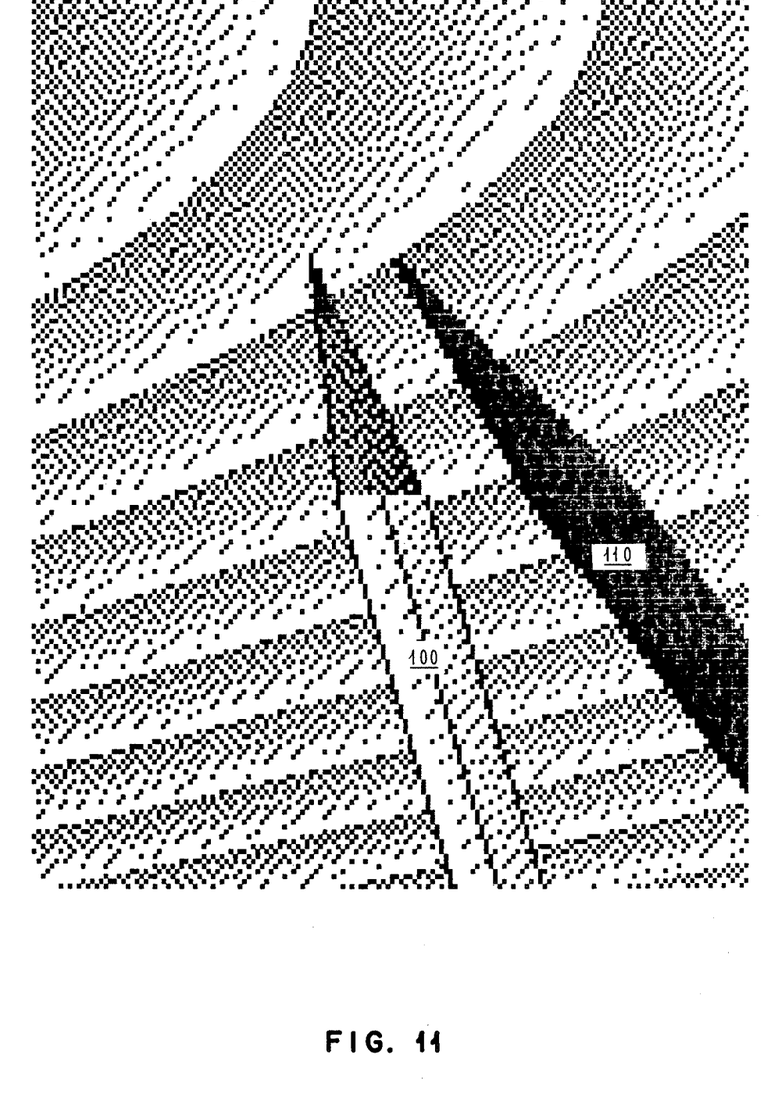
Figure 12:
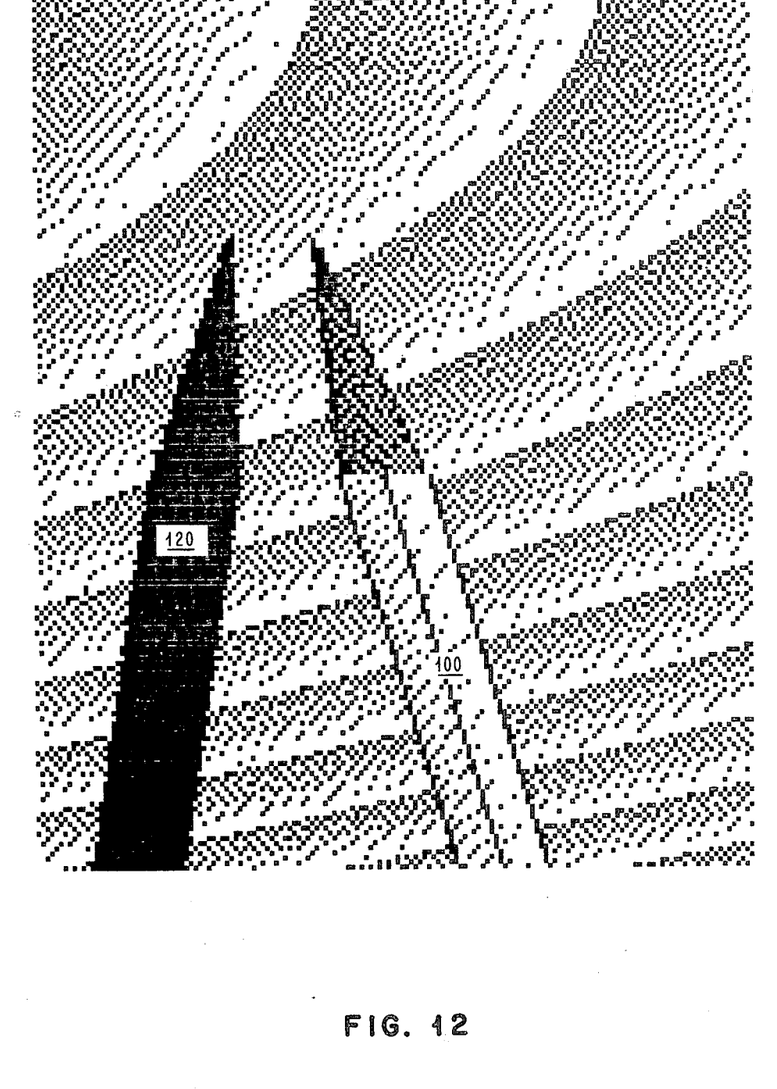
Figure 13:
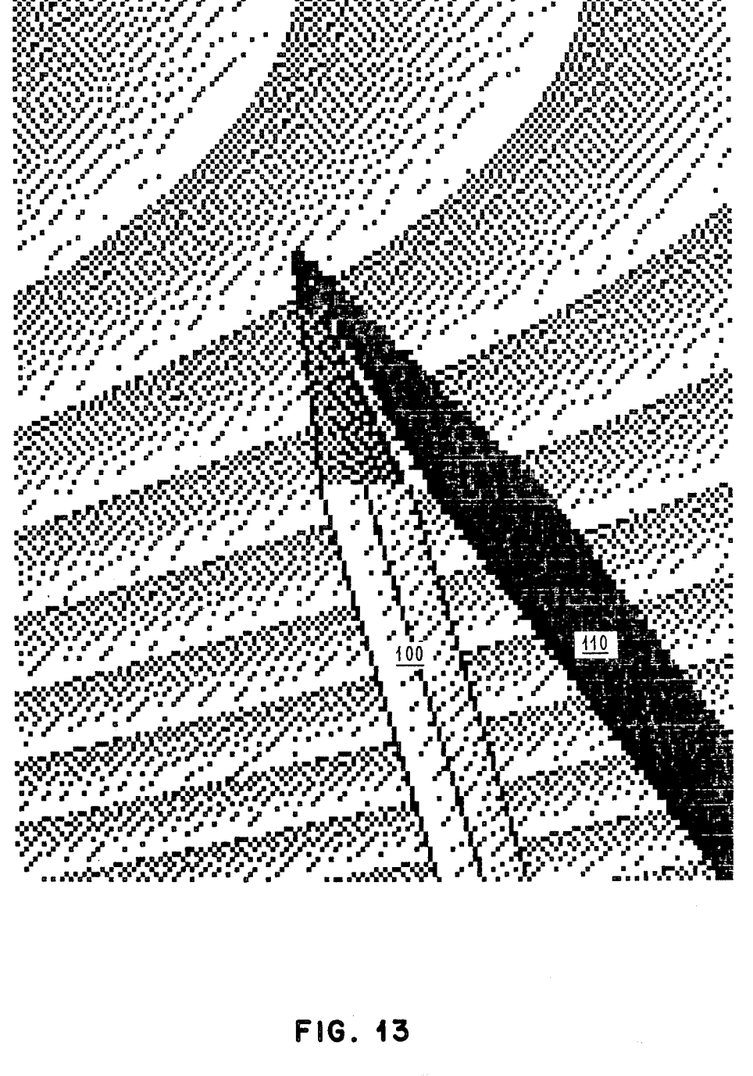

The first four program segments of lines 100 to 230 demonstrate the action of the two above-mentioned subroutines by calling the image generating routine with specified parameters, and immediately calling the output routine to generate the images of FIGS. 10 to 13. FIG. 10 depicts the pencil 100 and its shadow 110 as seen by a sensor on the left against white paper. FIG. 11 depicts the same pencil 100 and shadow 110 as viewed by a sensor on the left against a patterned background. As was previously stated, the pencil and its shadows may be viewed independently by sensors on the left and right side of the pencil. FIG. 12 depicts the pencil 100 and shadow 120 against a patterned background as viewed by a sensor on the right. FIG. 13 shows the shadow image 110 and the pencil image 100 merging as the pencil comes into contact with the background as seen from a sensor on the left.

TABLE 1

```
10  DEFINT A-Z
20  DIM AR(160),AR2(160),AE(160),AP(80)
30  T=1: B=180
40  '
50  'pencil up, sensor on left, white paper
60  '
70  HT=1: SD=1: BG=0
80  FOR YL=T TO B: GOSUB 1000: GOSUB 2000: NEXT
90  '
100 'pencil up, sensor on left, patterned paper
110 '
120 HT=1: SD=1: BG=1
130 FOR YL=T TO B: GOSUB 1000: GOSUB 2000: NEXT
140 '
150 'pencil up, sensor on right, patterned paper
160 '
170 HT=1: SD=-1: BG=1
180 FOR YL=T TO B: GOSUB 1000: GOSUB 2000: NEXT
190 '
200 'pencil down, sensor on left, patterned
    paper
210 '
220 HT=0: SD=1: BG=1
230 FOR YL=T TO B: GOSUB 1000: GOSUB 2000: NEXT
240 '
250 'pencil up, patterned paper,
260 'maximum of left and right sensor
270 '
280 HT=1: BG=1
290 FOR YL=T TO B: SD=1: GOSUB 1000
300 FOR X=1 TO 160: AR2(X)=AR(X): NEXT
310 SD=-1: GOSUB 1000
320 FOR X=1 TO 160: IF AR(X)<AR2(X) THEN
    AR(X)=AR2(X)
330 NEXT: GOSUB 2000: NEXT
340 '
350 'pencil up, patterned paper,
```

TABLE 1-continued

```
360  'minimum of left and right sensor
370  '
380  HT=1: BG=1
390  FOR YL=T TO B: SD=1: GOSUB 1000
400  FOR X=1 TO 160: AR2(X)=AR(X): NEXT
410  SD=-1: GOSUB 1000
420  FOR X=1 TO 160: IF AR(X)>AR2(X) THEN
     AR(X)=AR2(X)
430  NEXT: GOSUB 2000: NEXT
440  '
450  'pencil up, patterned paper
460  'minimum divided by maximum
470  'with provision for divide by zero
480  '
490  HT=1: BG=1
500  FOR YL=T TO B: SD=1: GOSUB 1000
510  FOR X=1 TO 160: AR2(X)=AR(X): NEXT
520  SD=-1: GOSUB 1000
530  FOR X=1 TO 160
540  MAX=AR(X): IF AR2(X)>MAX THEN MAX=AR2(X)
550  MIN=AR(X): IF AR2(X)<MIN THEN MIN=AR2(X)
560  AR(X)=(((MIN+3)*64)/(MAX+4))*4
580  NEXT: GOSUB 2000: NEXT
590  '
600  'pencil down, patterned paper,
610  'minimum divided by maximum
620  'with provision for divide by zero
630  '
640  HT=0: BG=1
650  FOR YL=T TO B: SD=1: GOSUB 1000
660  FOR X=1 TO 160: AR2(X)=AR(X): NEXT
670  SD=-1: GOSUB 1000
680  FOR X=1 TO 160
690  MAX=AR(X): IF AR2(X)>MAX THEN MAX=AR2(X)
700  MIN=AR(X): IF AR2(X)<MIN THEN MIN=AR2(X)
710  AR(X)=(((MIN+3)*64)/(MAX+4))*4
720  NEXT
730  GOSUB 2000: NEXT
740  STOP
750  '
760  '
993  '
994  'Subroutine simulates image.
995  'Given YL=y level, BG= background switch,
996  'HT= height of pencil above paper, and SD=
     shadow direction,
997  'returns AR(160)= array scan line from 0=
     black to 255= white.
998  '
1000 IF BG>0 THEN GOTO 1030
1010 FOR X=1 TO 160: AR(X)=255: NEXT
1020 GOTO 1040
1030 FOR X=1 TO 160:AR(X)=128+(2*X+((YL*YL) \ 32))
     MOD 128: NEXT
1040 IF YL<55 GOTO 1310
1050 C=YL \ 3+45
1060 D=(YL-53) \ 2+HT*18
1070 W=(YL*2-104 ) \ 5
1080 IF W>20 THEN W=20
1090 X1=C+SD*D-W \ 2
1100 X2=X1+(W*(9+SD)+1)/8
1110 IF X1<1 THEN X1=1
1140 IF X2>160 THEN X2=160
1150 FOR X=X1 TO X2: AR(X)=O: NEXT
1160 X1=C-W \ 2
1170 X2=C+W \ 2
1180 IF W>5 GOTO 1210
1190 FOR X=X1 TO X2: AR(X)=O: NEXT
1200 GOTO 1310
1210 IF W>19 GOTO 1260
1220 FOR X=X1 TO X2: AR(X)=96+(C-X)*SD*5: NEXT
1230 AR(X1)=O
1240 AR(X2)=O
1250 GOTO 1310
1260 FOR X=X1 TO X2: AR(X)=224+(C-X)*SD*3: NEXT
```

TABLE 1-continued

```
1270 AR(X1)=0
1280 AR(X2)=0
1290 AR(C)=0
1300 GOTO 1310
1310 RETURN
1993 '
1994 'Subroutine prints image.
1995 'Given AR(160)= array scan line and
1996 'YL= y level beginning at 1 and ending at
     180,
1997 'outputs image to IBM Personal Computer
     Printer.
1998 '
2000 Y=(YL-1) MOD 3 +1
2010 IF Y>1 GOTO 2030
2020 FOR X=1 TO 80: AP(X)=223: NEXT
2025 IF YL=1 THEN LPRINT CHR$(12)
2030 E=0
2040 C1=2>(2*Y-2)
2050 FOR X=1 TO 160
2060 X1=(X-1) \2+1
2070 C=C1*((X-1) MOD 2 +1)
2080 E=E+AE(X)+AR(X)
2090 IF E<128 GOTO 2115
2100 AP(X1)=AP(X1)-C
2110 E=E-255
2115 E=E \2
2120 AE(X)=E
2130 NEXT
2140 IF Y<3 GOTO 2160
2150 FOR X=1 TO 80: LPRINT CHR$(AP(X));: NEXT
2160 RETURN
2170 END
```

Figure 14:
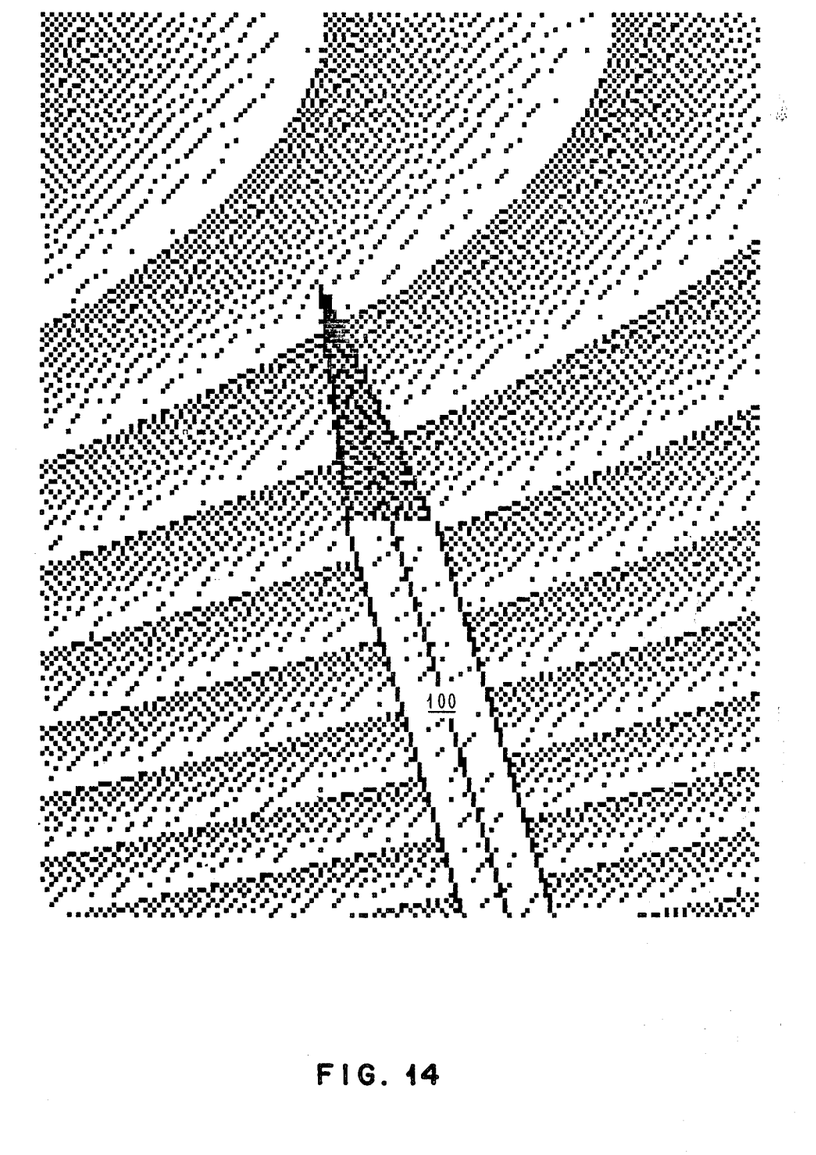

The program segment of lines 240 to 330 illustrates a program to take the mathematical maximum of two images point by point. For example, if a particular point of one image has a brightness of 0.4 units, and the corresponding point of a second image has a brightness of 0.6 units, then this routine returns a number of 0.6 units of brightness for the corresponding point of an output image. This is repeated for all points making up a picture. The two input images to this section are equal to those of FIGS. 11 and 12, and the output is shown in FIG. 14. Note that the visual effect of this mathematical operation is to remove all shadows.

Figure 15:
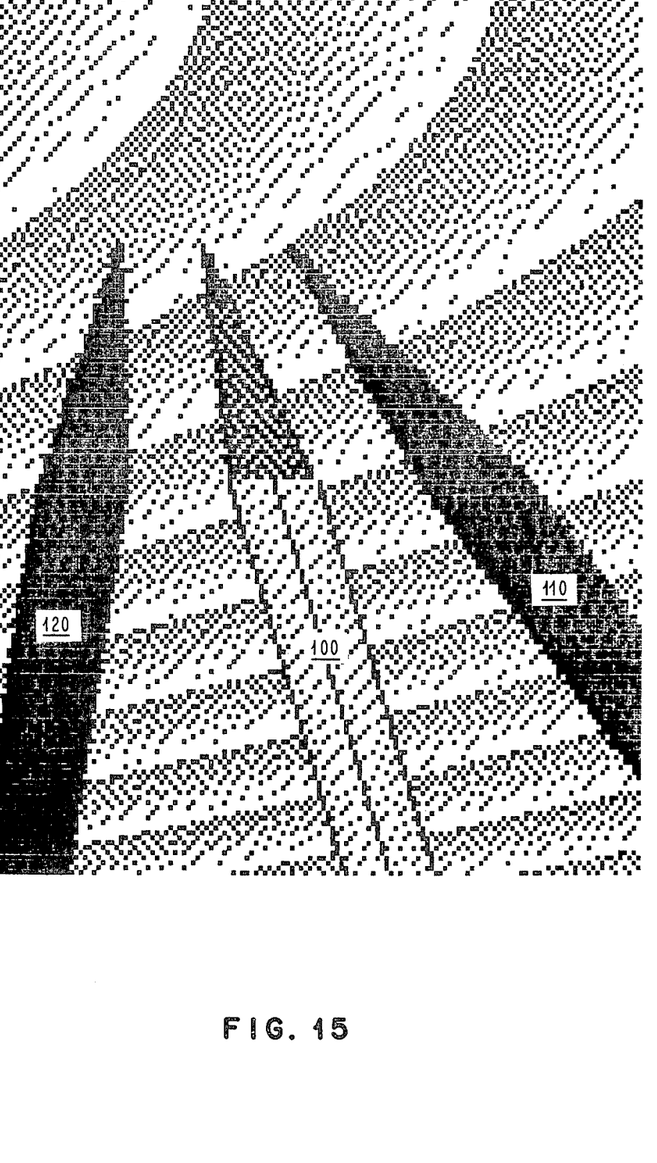

The program segment of lines 340 to 430 corresponds to the above segment except that the mathematical minimum of the two images is output in FIG. 15. Note the very deep shadows 120 and 110 on both sides of the pencil 100. Because these shadows are the mathematical minimum of two images, they are each as deep as those produced by a single light source. If an equivalent to this image had been photographed using two light sources to cast the two shadows, each shadow would be only half as deep.

Figure 16:
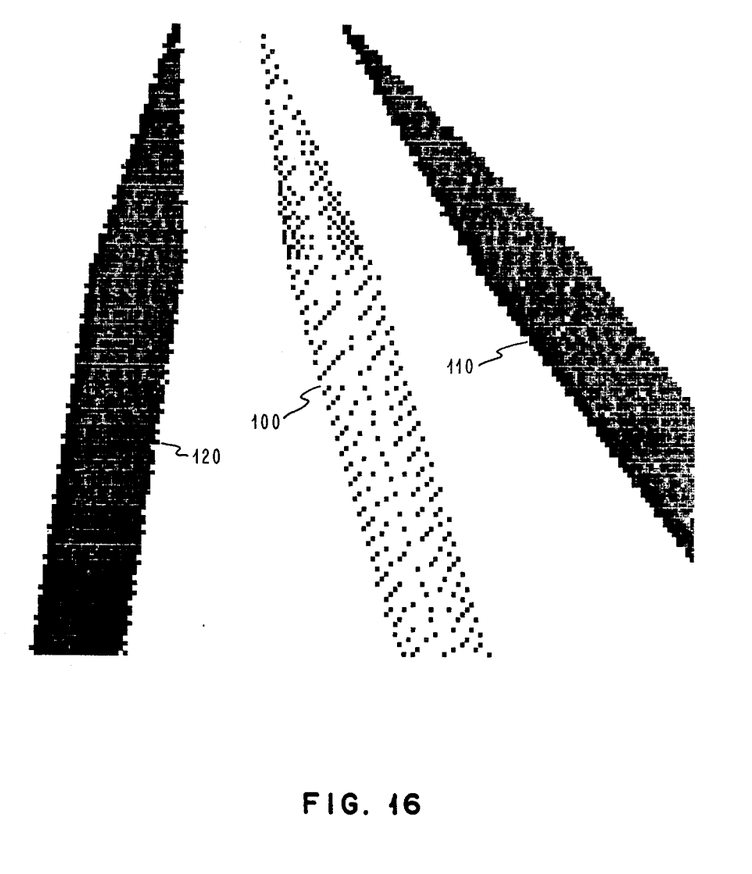

In order to eliminate the distracting background image and, thereby, enhance the ability to track the location of the pencil, the image of FIG. 15 is mathematically divided by the image of FIG. 14 point by point to minimize the pencil image and the background image, as shown in FIG. 16. This operation is performed in the program segment of lines 450 to 580. For example, suppose that at particular coresponding points the image of FIG. 11 has a brightness of 0.4 units, and the image of FIG. 12 has a brightness of 0.6 units. The maximum of these two numbers is 0.6, establishing the corresponding point of the image of FIG. 14; and the minimum is 0.4, as in FIG. 15. Dividing the minimum of 0.4 units of FIG. 15 by the maximum of 0.6 units of FIG. 14 yields 0.4/0.6=0.667, establishing the corresponding point of the image of FIG. 16. Note that in FIG. 16 the shadows 120 and 110 are still very dark while the background image is eliminated and the pencil image 100 is faint, consisting only of shadow effects.

Figure 17:
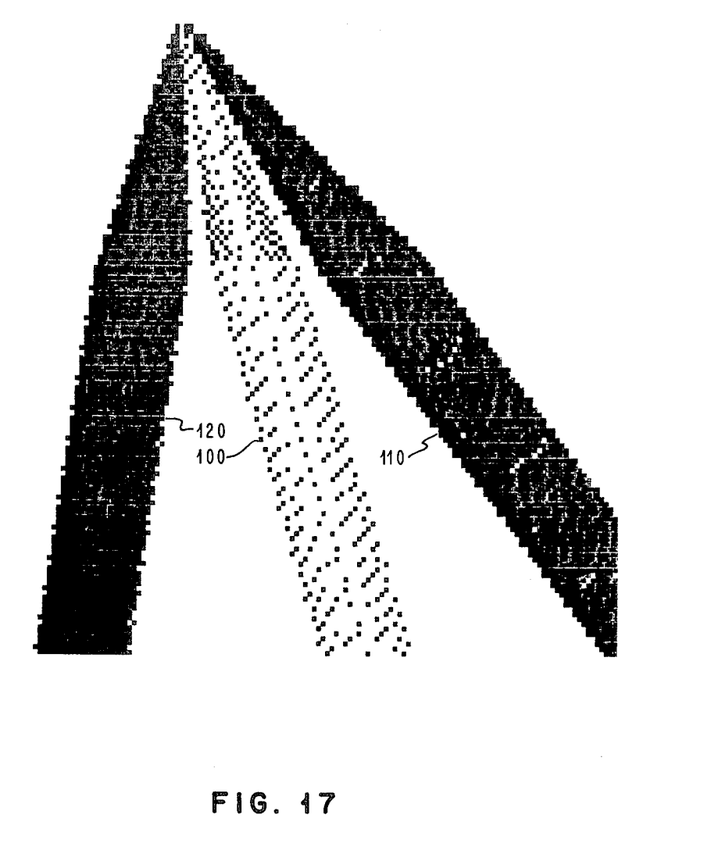

FIG. 17, computed by the program segment of lines 600-730, corresponds to the above segment except the original image generation is performed with the pencil touching the paper as in FIG. 13. As contact is made with the surface, the two shadows merge as shown in FIG. 17. Thus, it can be seen that the position of the pencil with respect to the surface can readily be determined, and likewise relative motion of the pencil with respect to the surface can be readily tracked.

Microfiche is unlikely to replace books in libraries, and displays are unlikely to replace papers in offices. People want something tangible to hold, to interpret without a machine, and to spread out on a desk. The method of this invention provides the only device capable of turning ordinary paper into an interactive tablet and display, and conversely of turning an electronic document into a desk top image resembling ordinary paper in many functional ways. The method of this invention provides a device that is equally at home performing the jobs of a display, a tablet, or a scanner, or all three at once, and all on the flat, gadget free, surface of an ordinary desk top. The operator is free to use ordinary paper with an ordinary pencil on an ordinary desk top, seeing nothing in the display area but a touch-sensitive image devoid of hardware.

It will be obvious to one skilled in the art that modifications to the specific examples used for illustration may be made without departing from the spirit and scope of this invention.

What is claimed is:

1. Apparatus for detecting the location of an object in a selected area comprising:
    flying spot scanner means for point by point scanning of said area;
    a plurality of non-concentric sensor means spaced about said area such that each senses an independent shadow on a common perspective of said object in response to the point by point scanning of said flying spot scanner means; and
    means for combining the point by point output of said sensor means to derive a resultant indicative of the location of said object.

2. An information processing system comprising in combination:
    a central processor and storage means;
    a flying spot scanner means, said flying spot scanner means including means for projecting an image representative of information stored in said storage means onto a selected area;
    means for introducing an image of information not stored in said storage means onto said area;
    further means in said flying spot scanner means for scanning said area and sensing said information not stored in said storage means; and
    means for storing said sensed information in said storage means.

3. The information processing system of claim 2 wherein said flying spot scanning means is a cathode ray tube.

4. The information processing system of claim 2 wherein said flying spot scanning means is a laser scanner.

5. An information processing system according to claim 2 wherein said means for storing said sensed information includes storing said sensed information in correlation with said stored information.

6. The information processing system of claim 5 wherein said flying spot scanning means is a cathode ray tube.

7. The information processing system of claim 2 wherein said means in said flying spot scanning means for sensing said information includes a plurality of non-concentric sensor means such that each senses an independent shadow on a common perspective of said means for introducing an image of information indicative of the movement of said means for introducing an image of information.

8. The information processing system of claim 7 wherein said flying spot scanning means is a laser scanner.

9. A method for non-invasive displaying and scanning information in an information processing system comprising:
   (a) projecting an image representative of information stored in said information processing system onto a work surface;
   (b) introducing an image of information not stored onto said work surface;
   (c) scanning said work surface and sensing said image of information not stored in said information processing system; and
   (d) storing said sensed information in said information processing system.

10. The method of claim 9 wherein said step of scanning and sensing includes scanning said work surface with a single point light source and sensing said image of information with a plurality of non-concentric sensors, each sensing an independent shadow on a common perspective of said image of information.

11. A method for detecting the location of an object in a selected area comprising the steps of:
   (a) scanning said selected area point by point;
   (b) sensing said selected area from a plurality of sensors such that each sensor senses an independent shadow on a common perspective if said object in response to said scanning; and
   (c) combining the point by point output of said sensor means to derive a resultant indicative of the location of said object.

* * * * *